(12) United States Patent
Chi et al.

(10) Patent No.: US 11,698,459 B2
(45) Date of Patent: Jul. 11, 2023

(54) METHOD AND APPARATUS FOR DETERMINING DRIVABLE REGION INFORMATION

(71) Applicant: Huawei Technologies Co., Ltd., Shenzhen (CN)

(72) Inventors: Qinghua Chi, Shanghai (CN); Kexing Lyu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/644,920

(22) Filed: Dec. 17, 2021

(65) Prior Publication Data

US 2022/0108552 A1 Apr. 7, 2022

Related U.S. Application Data

(63) Continuation of application No. PCT/CN2020/096755, filed on Jun. 18, 2020.

(30) Foreign Application Priority Data

Jun. 18, 2019 (CN) .......................... 201910525320.1

(51) Int. Cl.
 *G06V 20/56* (2022.01)
 *B60W 40/10* (2012.01)
 *G06K 9/62* (2022.01)

(52) U.S. Cl.
 CPC .............. *G06V 20/56* (2022.01); *B60W 40/10* (2013.01); *G06K 9/6288* (2013.01);
 (Continued)

(58) Field of Classification Search
 CPC ...... G06V 20/56; G06V 20/58; G06V 10/267; B60W 40/10; B60W 2420/42;
 (Continued)

(56) References Cited

U.S. PATENT DOCUMENTS

2009/0295917 A1 12/2009 Zhang et al.
2010/0104199 A1* 4/2010 Zhang ................. G06V 20/588
 382/199
(Continued)

FOREIGN PATENT DOCUMENTS

CN 101975951 A 2/2011
CN 107161141 A 9/2017
(Continued)

OTHER PUBLICATIONS

Translation of CN 108960183 to Li, (Year: 2018).*

*Primary Examiner* — Kenneth J Malkowski
(74) *Attorney, Agent, or Firm* — Slater Matsil, LLP

(57) ABSTRACT

Embodiments of this application provide a method and an apparatus for determining drivable region information. The method includes obtaining first information, where the first information includes information about an initial drivable region determined based on at least one image, and the at least one image is from at least one camera module. The method also includes obtaining second information, where the second information includes radar detection information. The method further includes determining first drivable region information based on the first information and the second information.

20 Claims, 13 Drawing Sheets

(52) U.S. Cl.
CPC ..... *B60W 2420/42* (2013.01); *B60W 2420/52* (2013.01); *B60W 2554/4049* (2020.02)

(58) Field of Classification Search
CPC ..... B60W 2420/52; B60W 2554/4049; B60W 30/0956; G06K 9/6288; G05D 1/0212; G05D 1/0214; G05D 1/0248; G01S 13/867; G06T 11/203; G06T 3/4069; H04N 19/523
See application file for complete search history.

(56) References Cited

U.S. PATENT DOCUMENTS

2015/0025800 A1   1/2015   An
2017/0285161 A1   10/2017   Izzat et al.
2018/0232947 A1   8/2018   Nehmadi et al.
2021/0264224 A1*   8/2021   Tamaoki ............... G01S 13/867

FOREIGN PATENT DOCUMENTS

| | | |
|---|---|---|
| CN | 107389084 A | 11/2017 |
| CN | 107991671 A | 5/2018 |
| CN | 105667518 B | 7/2018 |
| CN | 108297795 A | 7/2018 |
| CN | 108960183 A | 12/2018 |
| CN | 109298415 A | 2/2019 |
| CN | 109543600 A | 3/2019 |
| CN | 109733284 A | 5/2019 |
| CN | 109828571 A | 5/2019 |
| CN | 109829386 A | 5/2019 |
| WO | 2017079219 A1 | 5/2017 |

* cited by examiner

CONT. FROM FIG. 9A

CONT. FROM FIG. 9A

CONT. FROM FIG. 9A

706: The radar detects the initial driving region based on the first information, to obtain second information, where the second information includes radar detection information of the initial driving region 707: The radar sends the second information to the apparatus for obtaining driving region information 708: The apparatus for obtaining driving region information receives the second information sent by the radar

FIG. 9B

METHOD AND APPARATUS FOR DETERMINING DRIVABLE REGION INFORMATION

CROSS-REFERENCE TO RELATED APPLICATIONS

This application is a continuation of International Application No. PCT/CN2020/096755, filed on Jun. 18, 2020, which claims priority to Chinese Patent Application No. 201910525320.1, filed on Jun. 18, 2019. The disclosures of the aforementioned applications are hereby incorporated by reference in their entireties.

TECHNICAL FIELD

This application relates to the field of automatic driving technologies, and in particular, to a method and an apparatus for determining drivable region information.

BACKGROUND

A drivable region of a vehicle is a region, in a driving environment in which the vehicle is located, in which the vehicle can travel. The drivable region of the vehicle needs to avoid another vehicle, a pedestrian, a non-drivable region of a vehicle and another obstacle region on a road, or the like in the driving environment in which the vehicle is located.

In the prior art, an camera apparatus may be used to shoot an image of a to-be-detected region in a driving environment in which a vehicle is located, and then the image is identified by using a semantic segmentation algorithm or an instance segmentation algorithm that is based on a convolutional neural network (CNN), to determine a drivable region in the to-be-detected region. However, because the camera apparatus is greatly affected by a light condition, in an environment in which there is a shadow or a block, a misjudgment easily occurs. Consequently, obtained drivable region information is inaccurate. In addition, a laser radar may alternatively be used to transmit a laser to the to-be-detected region, or a vehicle-mounted radar may alternatively be used to transmit an electromagnetic wave to the to-be-detected region, and an obstacle object in the to-be-detected region is determined by using an echo. Therefore, the drivable region of the to-be-detected region is determined. However, the laser radar is easily affected by a climate, and in extreme climates such as rain and snow, measurement precision of the laser radar is reduced. Consequently, obtained drivable region information is inaccurate. The vehicle-mounted radar is easily affected by a noise signal in the environment, and when amplitude of the noise signal exceeds a detection threshold, the vehicle-mounted radar may misjudge an obstacle object and a false alarm occurs; or when there are a plurality of strong interference objects in the environment, the vehicle-mounted radar may miss detection of an obstacle object. Consequently, obtained drivable region information is inaccurate.

SUMMARY

Embodiments of this application provide a method and an apparatus for determining drivable region information, to resolve a problem that obtained drivable region information is inaccurate.

According to a first aspect, an embodiment of this application provides a method for determining drivable region information. The method includes: obtaining first information, where the first information includes information about an initial drivable region determined based on at least one image, and the at least one image is from at least one camera module; obtaining second information, where the second information includes radar detection information; and determining first drivable region information based on the first information and the second information.

In this implementation, first, the first information is obtained, where the first information includes the information that is about the initial drivable region and that is determined based on the image; then, the second information including the radar detection information is obtained; and finally, the first drivable region information is determined based on the first information and the second information. It can be learned that the first drivable region information, obtained according to the method for determining drivable region information provided in this implementation, is obtained by fusing image information and the radar detection information, and has higher accuracy; and when detection performed by one of an camera apparatus and a radar apparatus is inaccurate, for example, when the camera apparatus is in an environment in which there is a shadow or a block, or when a laser radar is affected by a climate or when a vehicle-mounted radar is affected by a noise signal, the accuracy of the first drivable region information can be improved by using detection information of the other one of the camera apparatus and the radar apparatus, and safety of vehicle traveling is ensured.

With reference to the first aspect, in a first possible implementation of the first aspect, the radar detection information includes detection information of the initial drivable region.

In this implementation, the detection information that is of the initial drivable region and that is included in the radar detection information is determined as the second information. Subsequently, a radar only needs to send the detection information of the initial drivable region to an apparatus for obtaining drivable region information, so that a data transmission amount is relatively small; and when the first drivable region information is subsequently determined based on the first information and the second information, an amount of data that needs to be fused is relatively small, and a calculation amount is relatively small. Therefore, efficiency of determining the drivable region information can be improved.

With reference to the first aspect, in a second possible implementation of the first aspect, the method further includes: determining, based on the first information and the second information, whether a region of interest exists.

In this implementation, the accuracy of the first drivable region information may be further determined by determining whether a region of interest exists; and therefore, the accuracy of the determined first drivable region information is ensured.

With reference to the first aspect, in a third possible implementation of the first aspect, the method further includes: determining that a region of interest exists; obtaining second drivable region information and region information of the region of interest; obtaining a detection result of the region of interest based on the region information of the region of interest; and determining the first drivable region information based on the second drivable region information and the detection result of the region of interest.

In this implementation, when it is determined that there is the region of interest, information obtained after the first information and the second information are fused is determined as the second drivable region information; the region of interest is detected based on the region information of the region of interest, to obtain the detection result of the region of interest; and finally, the first drivable region information is determined based on the second drivable region information and the detection result of the region of interest, so that the accuracy of the determined first drivable region information is higher, and safety is higher when a vehicle subsequently travels based on the first drivable region information.

With reference to the first aspect, in a fourth possible implementation of the first aspect, the information about an initial drivable region includes information about at least one pixel corresponding to the initial drivable region; or the information about an initial drivable region is indicated by boundary information of the initial drivable region.

In this implementation, the information about an initial drivable region may be indicated by using the boundary information of the initial drivable region, so that when the information about an initial drivable region is sent, a data transmission amount can be reduced, and the efficiency of determining the drivable region information can be improved.

With reference to the first aspect, in a fifth possible implementation of the first aspect, the radar detection information includes location coordinates information; or the radar detection information includes location coordinates information and covariance information of the location coordinates.

In this implementation, the radar detection information may include the information about the location coordinates and the covariance information of the location coordinates, so that after the radar sends the radar detection information to the apparatus for obtaining drivable region information, the apparatus for obtaining drivable region information can more accurately determine a target point detected by the radar; and therefore, the accuracy of the first drivable region information that is subsequently determined is improved.

According to a second aspect, an embodiment of this application provides a method for determining drivable region information. The method includes: receiving first information, where the first information includes information about an initial drivable region determined based on at least one image, and the at least one image is from at least one camera module; generating second information, where the second information includes radar detection information that is of the initial drivable region generated based on the first information; and sending the second information.

In this implementation, first, the first information is received; then the second information including the radar detection information of the initial drivable region is generated based on the first information; and finally, the second information is sent to an apparatus for obtaining drivable region information. It can be learned that, according to the method provided in this implementation, a radar only needs to send the radar detection information of the initial drivable region to the apparatus for obtaining drivable region information, so that a data transmission amount is relatively small; and when first drivable region information is subsequently determined based on the first information and the second information, an amount of data that needs to be fused is relatively small, and a calculation amount is relatively small. Therefore, efficiency of determining the drivable region information can be improved.

According to a third aspect, an embodiment of this application provides an apparatus for determining drivable region information. The apparatus includes: an obtaining module, configured to obtain first information, where the first information includes information about an initial drivable region determined based on at least one image, and the at least one image is from at least one camera module, where the obtaining module is further configured to obtain second information, where the second information includes radar detection information; and a determining module, configured to determine first drivable region information based on the first information and the second information.

The apparatus provided in this implementation first obtains the first information, where the first information includes the information that is about the initial drivable region and that is determined based on the image; then obtains the second information including the radar detection information; and finally, determines the first drivable region information based on the first information and the second information. It can be learned that the first drivable region information, obtained by the apparatus for determining drivable region information provided in this implementation, is obtained by fusing image information and the radar detection information, and has higher accuracy; and when detection performed by one of an camera apparatus and a radar apparatus is inaccurate, for example, when the camera apparatus is in an environment in which there is a shadow or a block, or when a laser radar is affected by a climate or when a vehicle-mounted radar is affected by a noise signal, the accuracy of the first drivable region information can be improved by using detection information of the other one of the camera apparatus and the radar apparatus, and safety of vehicle traveling is ensured.

With reference to the third aspect, in a first possible implementation of the third aspect, the radar detection information includes detection information of the initial drivable region.

The apparatus provided in this implementation determines the detection information that is of the initial drivable region and that is included in the radar detection information as the second information. Subsequently, a radar only needs to send the detection information of the initial drivable region to an apparatus for obtaining drivable region information, so that a data transmission amount is relatively small; and when the first drivable region information is subsequently determined based on the first information and the second information, an amount of data that needs to be fused is relatively small, and a calculation amount is relatively small. Therefore, efficiency of determining the drivable region information can be improved.

With reference to the third aspect, in a second possible implementation of the third aspect, the determining module is further configured to: determine, based on the first information and the second information, whether a region of interest exists.

The apparatus provided in this implementation may further determine the accuracy of the first drivable region information by determining whether a region of interest exists; and therefore, the accuracy of the determined first drivable region information is ensured.

With reference to the third aspect, in a third possible implementation of the third aspect, the determining module is further configured to determine that a region of interest exists; the obtaining module is further configured to obtain second drivable region information and region information of the region of interest; the obtaining module is further configured to obtain a detection result of the region of interest based on the region information of the region of interest; and the determining module is further configured to determine the first drivable region information based on the second drivable region information and the detection result of the region of interest.

When determining that there is the region of interest, the apparatus provided in this implementation determines, as the second drivable region information, information obtained after the first information and the second information are fused; detects the region of interest based on the region information of the region of interest, to obtain the detection result of the region of interest; and finally, determines the first drivable region information based on the second drivable region information and the detection result of the region of interest, so that the accuracy of the determined first drivable region information is higher, and safety is higher when a vehicle subsequently travels based on the first drivable region information.

With reference to the third aspect, in a fourth possible implementation of the third aspect, the information about an initial drivable region includes information about at least one pixel corresponding to the initial drivable region; or the information about an initial drivable region is indicated by boundary information of the initial drivable region.

According to the apparatus provided in this implementation, the information about an initial drivable region may be indicated by using the boundary information of the initial drivable region, so that when the information about an initial drivable region is sent, a data transmission amount can be reduced, and the efficiency of determining the drivable region information can be improved.

With reference to the third aspect, in a fifth possible implementation of the third aspect, the radar detection information includes location coordinates information; or the radar detection information includes location coordinates information and covariance information of the location coordinates.

According to the apparatus provided in this implementation, the radar detection information may include the information about the location coordinates and the covariance information of the location coordinates, so that after the radar sends the radar detection information to the apparatus for obtaining drivable region information, the apparatus for obtaining drivable region information can more accurately determine a target point detected by the radar; and therefore, the accuracy of the first drivable region information that is subsequently determined is improved.

According to a fourth aspect, an embodiment of this application provides an apparatus for determining drivable region information. The apparatus includes: a receiving module, configured to receive first information, where the first information includes information about an initial drivable region determined based on at least one image, and the at least one image is from at least one camera module; a generation module, configured to generate second information, where the second information includes radar detection information that is of the initial drivable region generated based on the first information; and a sending module, configured to send the second information.

The apparatus provided in this implementation first receives the first information; then generates, based on the first information, the second information including the radar detection information of the initial drivable region; and finally, sends the second information to an apparatus for obtaining drivable region information. It can be learned that, according to the apparatus provided in this implementation, a radar only needs to send the radar detection information of the initial drivable region to the apparatus for obtaining drivable region information, so that a data transmission amount is relatively small; and when first drivable region information is subsequently determined based on the first information and the second information, an amount of data that needs to be fused is relatively small, and a calculation amount is relatively small. Therefore, efficiency of determining the drivable region information can be improved.

According to a fifth aspect, an embodiment of this application provides an apparatus. The apparatus includes a processor, the processor is configured to couple to a memory, and the processor is configured to read instructions in the memory, so that the apparatus performs, according to the instructions, the method according to any one of the first aspect, the second aspect, the possible implementations of the first aspect, and the possible implementations of the second aspect.

According to a sixth aspect, an embodiment of this application provides a computer storage medium. The computer storage medium stores instructions; and when the instructions is run on a computer, the computer is enabled to perform some or all steps of the method according to any one of the first aspect, the second aspect, the possible implementations of the first aspect, and the possible implementations of the second aspect.

According to a seventh aspect, an embodiment of this application provides a computer program product. When the computer program product runs on a computer, the computer is enabled to perform some or all steps of the method according to any one of the first aspect, the second aspect, the possible implementations of the first aspect, and the possible implementations of the second aspect.

To resolve the problem that obtained drivable region information is inaccurate, the embodiments of this application provide the method and the apparatus for determining drivable region information. In the method, first, the first information is obtained, where the first information includes the information that is about the initial drivable region and that is determined based on the image; then, the second information including the radar detection information is obtained; and finally, the first drivable region information is determined based on the first information and the second information. It can be learned that the first drivable region information, obtained according to the method for determining drivable region information provided in this application, is obtained by fusing image information and the radar detection information, and has higher accuracy; and when detection performed by one of an camera apparatus and a radar apparatus is inaccurate, for example, when the camera apparatus is in an environment in which there is a shadow or a block, or when a laser radar is affected by a climate or when a vehicle-mounted radar is affected by a noise signal, the accuracy of the first drivable region information can be improved by using detection information of the other one of the camera apparatus and the radar apparatus, and safety of vehicle traveling is ensured.

BRIEF DESCRIPTION OF THE DRAWINGS

FIG. 9A and FIG. 9B are a schematic flowchart of another implementation of a method for obtaining second information according to an embodiment of this application;

DETAILED DESCRIPTION OF ILLUSTRATIVE EMBODIMENTS

The following describes the technical solutions of this application with reference to the accompanying drawings.

A system for determining drivable region information provided in this application is first described, and a method for determining drivable region information provided in this application may be implemented in the system.

Figure 1:
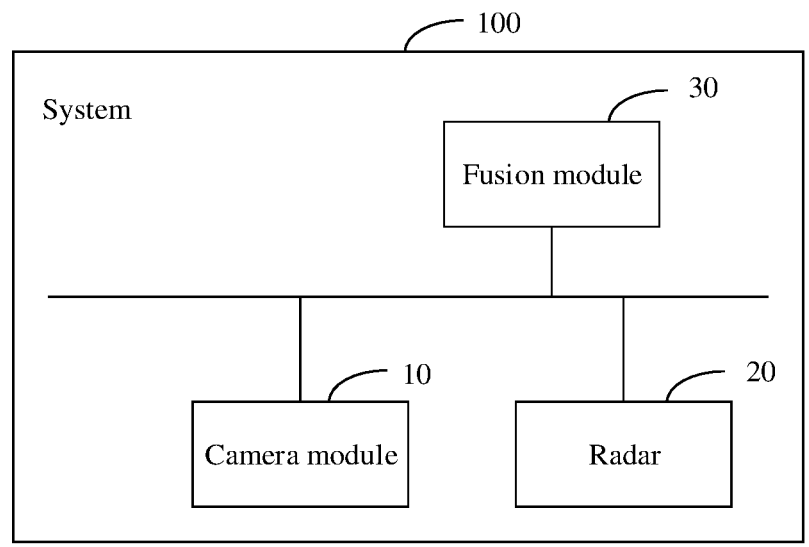
FIG. 1 is a structural block diagram of an implementation of a system for determining drivable region information according to an embodiment of this application.
Figure 2:
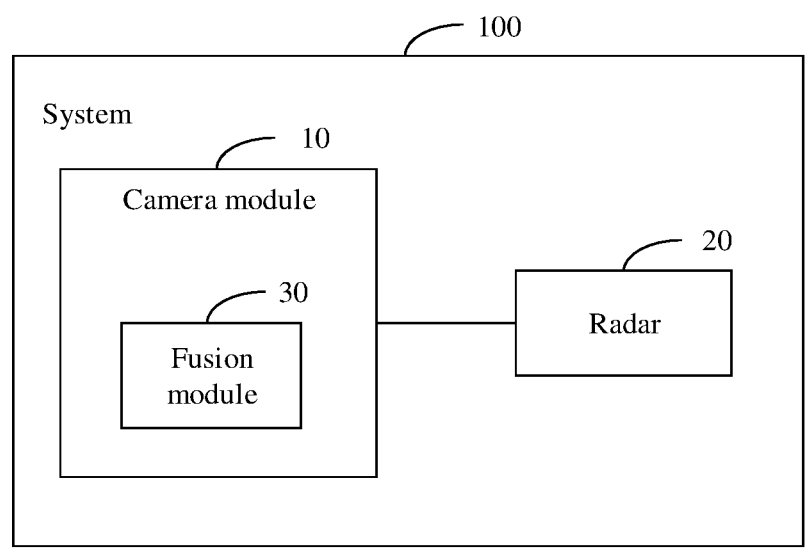
FIG. 2 is a structural block diagram of another implementation of a system for determining drivable region information according to an embodiment of this application.

FIG. 1 is a structural block diagram of an implementation of a system for determining drivable region information according to this application. FIG. 2 is a structural block diagram of another implementation of a system for determining drivable region information according to this application. With reference to FIG. 1 or FIG. 2, it can be learned that the system 100 may include an camera module 10, a radar 20, and a fusion module 30. There is at least one camera module 10, and the camera module 10 may be configured to: shoot an image of a driving environment in which a vehicle is located, and determine information about an initial drivable region based on the shot image. The radar 20 may be a laser radar or a vehicle-mounted radar, and may be configured to: transmit a laser or an electromagnetic wave in the driving environment in which the vehicle is located, and generate radar detection information based on an echo of the laser or the electromagnetic wave. The fusion module 30 may be configured to fuse the information that is about the initial drivable region and that is determined by the camera module 10 and the radar detection information generated by the radar 20, to obtain drivable region information of the vehicle, so that safety is higher when the vehicle travels based on the drivable region information. The fusion module 30 may be disposed separately (as shown in FIG. 1), or may be disposed in the camera module 10 (as shown in FIG. 2).

Persons skilled in the art may understand that a structure of the system for determining drivable region information shown in FIG. 1 or FIG. 2 does not constitute a limitation on the system for determining drivable region information in this application. The system for determining drivable region information in this application may include more or fewer components than those shown in the figure, or some components may be combined, or the system may have different component arrangements. The components shown in the figure may be implemented by hardware, software, or a combination of software and hardware.

The following describes embodiments of the method for determining drivable region information provided in this application.

Figure 3:
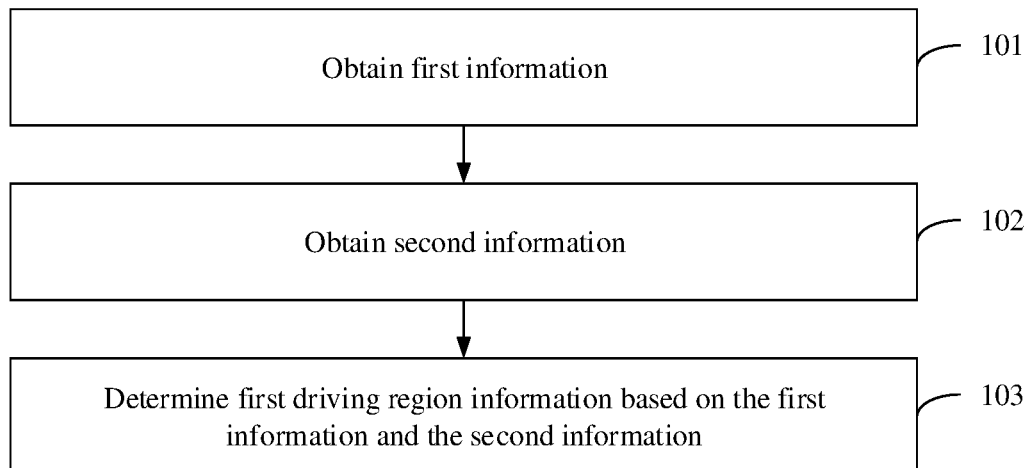
FIG. 3 is a schematic flowchart of an implementation of a method for determining drivable region information according to an embodiment of this application.

FIG. 3 is a schematic flowchart of an implementation of a method for determining drivable region information according to this application. The method may be performed by a fusion module that is separately disposed, or may be performed by a camera module that is internally equipped with a fusion module. With reference to FIG. 3, it can be learned that the method includes the following steps.

Step 101: Obtain first information.

The first information includes information about an initial drivable region determined based on at least one image, and the at least one image is from at least one camera module. Further, for specific content of the first information, refer to content of a subsequent embodiment.

Figure 4:
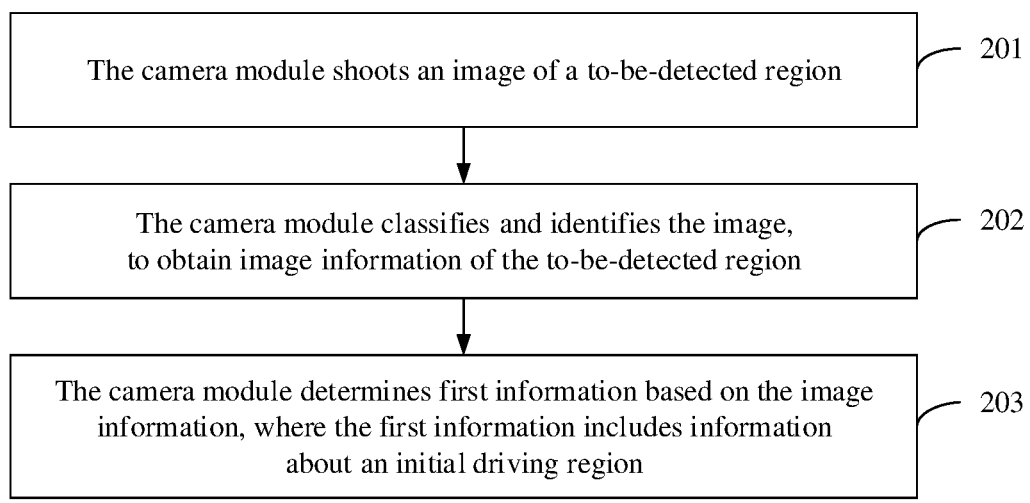
FIG. 4 is a schematic flowchart of an implementation of a method for obtaining first information according to an embodiment of this application.

The first information may be obtained in a plurality of implementations. When the method shown in FIG. 3 is performed by the camera module that is internally equipped with the fusion module, as shown in FIG. 4, the obtaining first information may be implemented according to the following steps.

Step 201: The camera module shoots an image of a to-be-detected region.

The to-be-detected region is a detection region that is in a driving environment in which a vehicle is located and in which drivable region information is to be determined. In other words, in the driving environment in which the vehicle is located, a detection region in which drivable region information needs to be determined may be determined as the to-be-detected region. For example, when drivable region information in a detection region right before the vehicle needs to be determined, the detection region right before the vehicle may be determined as the to-be-detected region; or when drivable region information in a detection region behind the vehicle needs to be determined, the detection region behind the vehicle may be determined as the to-be-detected region. By analogy, when drivable region information in another detection region in the driving environment in which the vehicle is located needs to be determined, the detection region may be determined as the to-be-detected region. Examples are not listed one by one herein.

There may be one or more images of the to-be-detected region. If there are a plurality of images of the to-be-detected region, the plurality of images may be shot by one camera module, or may be shot by a plurality of camera modules.

Step 202: The camera module classifies and identifies the image, to obtain image information of the to-be-detected region.

Optionally, the camera module may classify and identify the image by using a semantic segmentation algorithm or an instance segmentation algorithm that is based on a CNN, to obtain the image information of the to-be-detected region. The image information of the to-be-detected region includes information about m pixels corresponding to the to-be-detected region, and the information about the m pixels may be represented as $[(a_1, b_1, c_1), (a_2, b_2, c_2), \ldots, (a_i, b_i, c_i), \ldots, (a_m, b_m, c_m)]$ in a pixel coordinate system, where $a_i$ and $b_i$ indicate location coordinates of an $i^{th}$ pixel corresponding to the to-be-detected region, $c_i$ indicates a category of the $i^{th}$ pixel, and m is an integer greater than or equal to 1.

It should be noted that the image information of the to-be-detected region may alternatively be converted to be represented in a vehicle coordinate system or a world coordinate system.

Step 203: The camera module determines the first information based on the image information, where the first information includes the information about an initial drivable region.

After obtaining the image information of the to-be-detected region, the camera module determines, based on a category corresponding to each pixel in the image information, information about all pixels whose category is "drivable" as the information about an initial drivable region, and correspondingly determines a region including all of the pixels whose category is "drivable" as the initial drivable region.

The information about an initial drivable region may be represented in a plurality of manners. Examples are shown below.

Manner 1: The information about an initial drivable region includes information about n pixels corresponding to the initial drivable region, and the information about the n pixels may be represented as $[(d_1, e_1), (d_2, e_2), \ldots, (d_i, e_i), \ldots, (d_n, e_n)]$ in the pixel coordinate system, where $d_i$ and $e_i$ indicate location coordinates of an $i^{th}$ pixel corresponding to the initial drivable region, n is an integer greater than or equal to 1, and n is less than or equal to m.

Manner 2: The information about an initial drivable region may be represented by using boundary information of the initial drivable region. The boundary information includes information about f pixels, and the information about the f pixels may be represented as $[(u_1, h_1), (u_2, h_2), (u_3, h_3), \ldots, (u_i, h_i), \ldots, (u_f, h_f)]$ in the pixel coordinate system, where $u_i$, $h_i$ indicates location coordinates of an $i^{th}$ pixel in the boundary information, f is an integer greater than or equal to 1, and f is less than or equal to n.

Manner 3: The information about an initial drivable region may be represented by using boundary information of the initial drivable region. The boundary information includes information about r pixels, and the information about the r pixels may be represented as $[step, (g_1, k_1), k_2, k_3, \ldots, k_i, \ldots, k_r]$ or $[step, (g_1, k_1), k_2, k_3, \ldots, k_i, \ldots, k_r, method]$ in the pixel coordinate system, where $g_1$, $k_1$ indicates location coordinates of the first pixel in the boundary information, $k_i$ indicates a vertical coordinate of an $i^{th}$ pixel in the boundary information, a horizontal coordinate of the $i^{th}$ pixel is obtained based on the step, the step indicates an interval step between the horizontal coordinate of the $i^{th}$ pixel and a horizontal coordinate of an $(i+1)^{th}$ pixel, an interval step between the horizontal coordinate of the $i^{th}$ pixel and a horizontal coordinate of an $(i-1)^{th}$ pixel is the same as the interval step between the horizontal coordinate of the $i^{th}$ pixel and the horizontal coordinate of the $(i+1)^{th}$ pixel, the method indicates a connection relationship between all interval steps, r is an integer greater than or equal to 1, and r is less than n.

Manner 4: The information about an initial drivable region may be represented by using boundary information of the initial drivable region. The boundary information includes information about s pixels, and the information about the s pixels may be represented as $[(p_1, q_1), (p_2, q_2), (p_3, q_3), \ldots, (p_i, q_i), \ldots, (p_s, q_s), method]$ in the pixel coordinate system, where $p_i$, $q_i$ indicates location coordinates of an $i^{th}$ pixel in the boundary information, there is an interval step between a horizontal coordinate of the $i^{th}$ pixel and a horizontal coordinate of an $(i+1)^{th}$ pixel, an interval step between the horizontal coordinate of the $i^{th}$ pixel and a horizontal coordinate of an $(i-1)^{th}$ pixel is different from the interval step between the horizontal coordinate of the $i^{th}$ pixel and the horizontal coordinate of the $(i+1)^{th}$ pixel, the method indicates a connection relationship between all interval steps, s is an integer greater than or equal to 1, and s is less than n.

The method in the manner 3 or the manner 4 may be set to a plurality of manners. For example, the method may be set to linear interpolation, quadratic interpolation, cubic spline interpolation, or shape-preserving piecewise cubic interpolation.

It should be noted that the information about an initial drivable region may alternatively be converted to be represented in the vehicle coordinate system or the world coordinate system.

When the method shown in FIG. 4 is used to obtain the first information, because the fusion module is disposed inside the camera module, the first information is directly obtained through the fusion module, so that a data transmission amount is reduced, and efficiency of determining the drivable region information can be subsequently improved.

Figure 5:
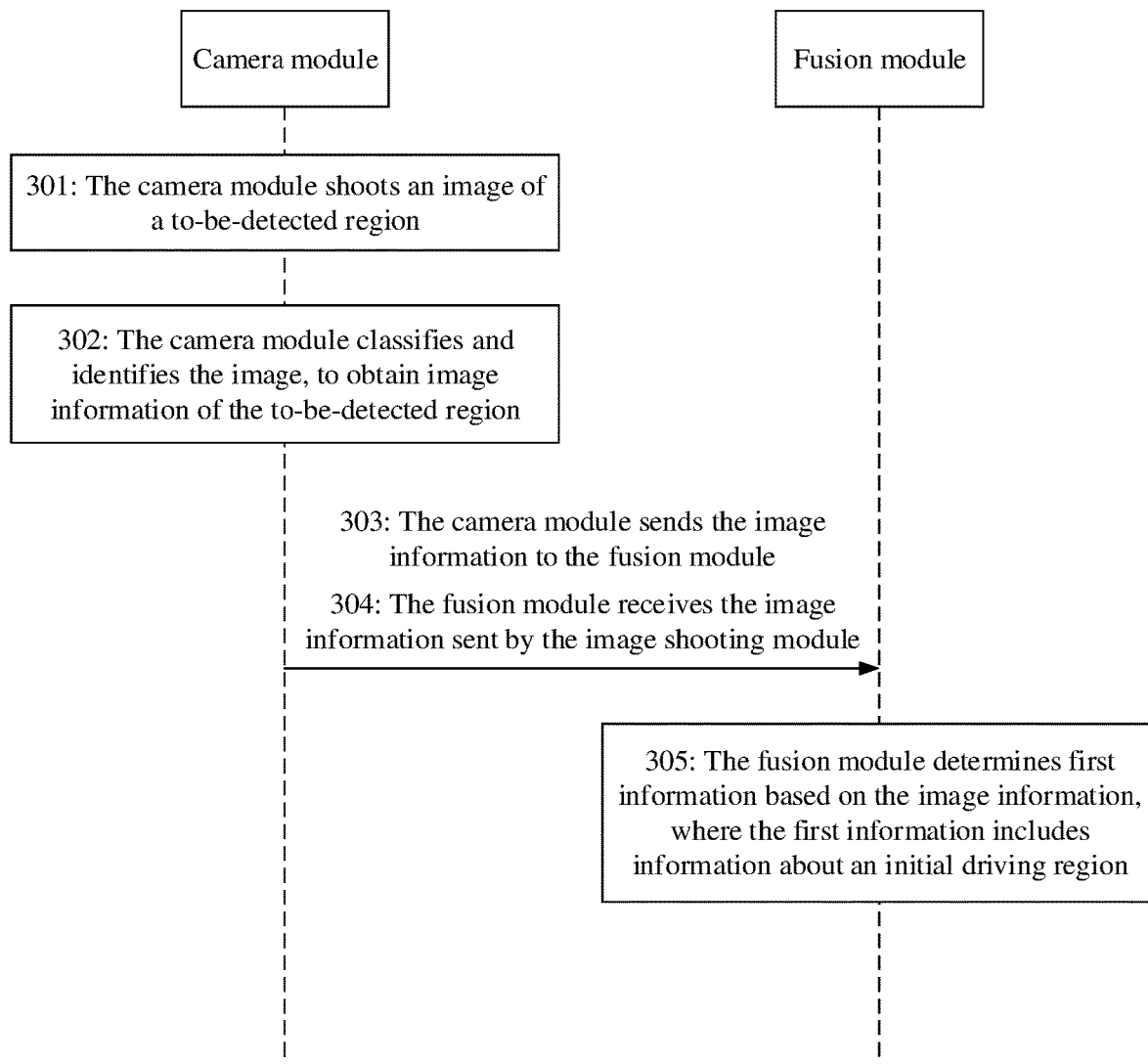
FIG. 5 is a schematic flowchart of another implementation of a method for obtaining first information according to an embodiment of this application.

When the method shown in FIG. 3 is performed by the fusion module that is separately disposed, as shown in FIG. 5, the obtaining first information may alternatively be implemented according to the following steps.

Step 301: The camera module shoots an image of a to-be-detected region.

Step 302: The camera module classifies and identifies the image, to obtain image information of the to-be-detected region.

For specific implementations of step 301 and step 302, refer to step 201 and step 202 in the embodiment shown in FIG. 4. Details are not described herein again.

Step 303: The camera module sends the image information to the fusion module.

Step 304: The fusion module receives the image information sent by the camera module.

Step 305: The fusion module determines the first information based on the image information, where the first information includes the information about an initial drivable region.

For a specific implementation of step 305, refer to step 203 in the embodiment shown in FIG. 4. Details are not described herein again.

When the method shown in FIG. 5 is used to obtain the first information, a data calculation amount in the camera module can be reduced, and overheads of the camera module can be reduced, thereby saving resources of the camera module.

Figure 6:
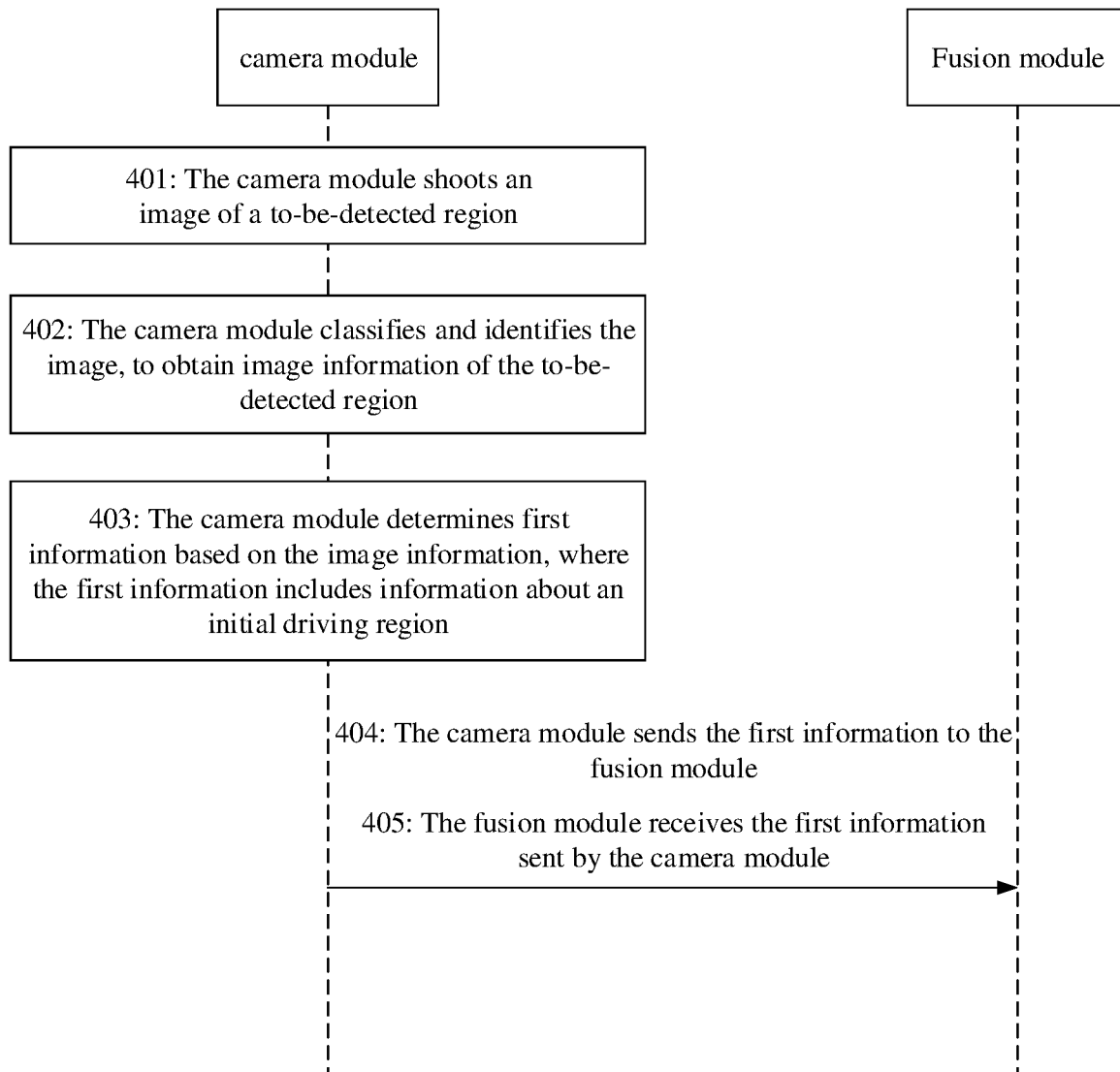
FIG. 6 is a schematic flowchart of another implementation of a method for obtaining first information according to an embodiment of this application.

When the method shown in FIG. 3 is performed by the fusion module that is separately disposed, as shown in FIG. 6, the obtaining first information may alternatively be implemented according to the following steps.

Step 401: The camera module shoots an image of a to-be-detected region.

Step 402: The camera module classifies and identifies the image, to obtain image information of the to-be-detected region.

Step 403: The camera module determines the first information based on the image information, where the first information includes the information about an initial drivable region.

For specific implementations of step 401 to step 403, refer to step 201 to step 203 in the embodiment shown in FIG. 4. Details are not described herein again.

Step 404: The camera module sends the first information to the fusion module.

When the camera module sends the first information to the fusion module, if the information that is about the initial drivable region and that is included in the first information is represented in any one of the foregoing manner 2 to manner 4, a data transmission amount can be reduced, and efficiency of determining drivable region information can be subsequently improved.

Step 405: The fusion module receives the first information sent by the camera module.

When the method shown in FIG. 6 is used to obtain the first information, a data calculation amount in the fusion module can be reduced, and overheads of the fusion module can be reduced, thereby saving resources of the fusion module.

Step 102: Obtain second information.

The second information includes radar detection information. Further, for specific content of the second information, refer to content of a subsequent embodiment.

Figure 7:
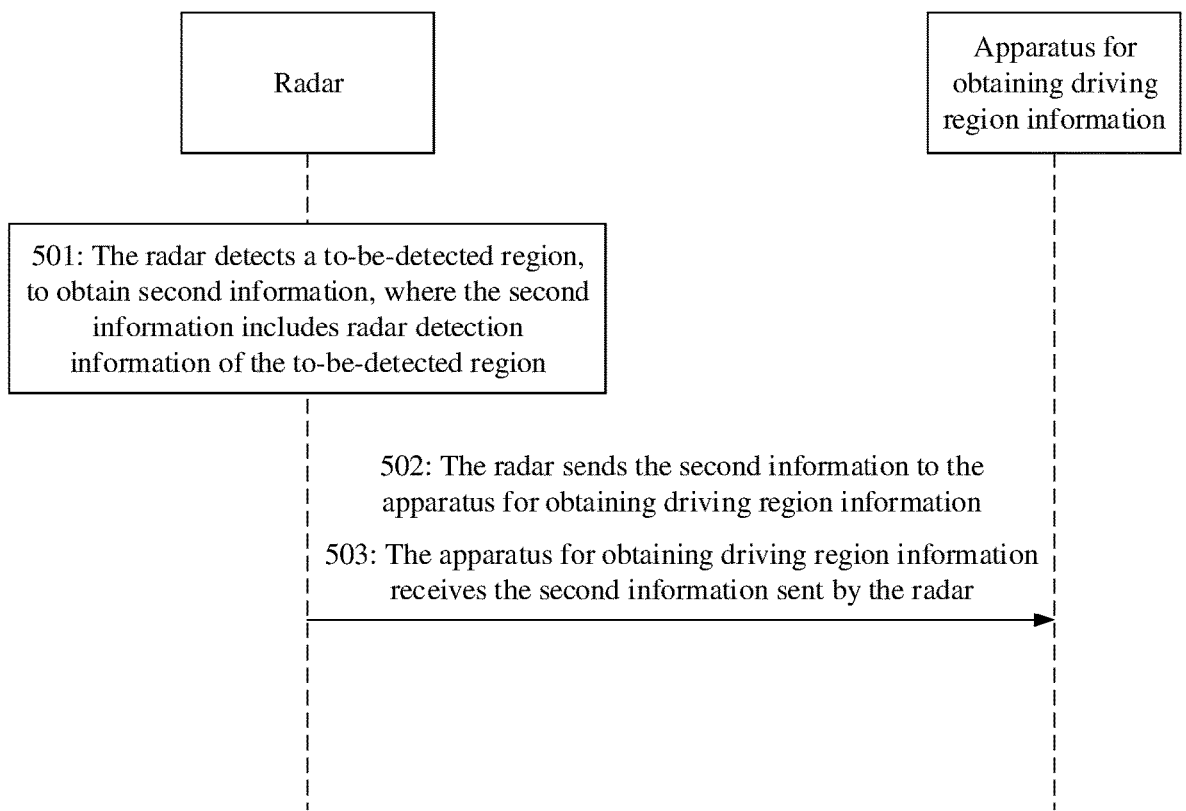
FIG. 7 is a schematic flowchart of an implementation of a method for obtaining second information according to an embodiment of this application.

The second information may be obtained in a plurality of implementations. As shown in FIG. 7, the obtaining second information may be implemented according to the following steps.

Step 501: A radar detects the to-be-detected region, to obtain the second information, where the second information includes radar detection information of the to-be-detected region.

The radar may be a laser radar or a vehicle-mounted radar. After transmitting a laser or an electromagnetic wave to the to-be-detected region, the radar may obtain the radar detection information of the to-be-detected region by using an echo of the laser or the electromagnetic wave.

The radar detection information of the to-be-detected region includes information about t target points corresponding to the to-be-detected region, and the information about the t target points may be represented as $[(X_1, Y_1), (X_2, Y_2), \ldots, (X_i, Y_i), \ldots, (X_t, Y_t)]$ or $[(X_1, Y_1, R_1), (X_2, Y_2, R_2), \ldots, (X_i, Y_i, R_i), \ldots, (X_t, Y_t, R_t)]$ in the vehicle coordinate system or the world coordinate system, where $X_i$ and $Y_i$ indicate location coordinates information of an $i^{th}$ target point corresponding to the to-be-detected region, $R_i$ indicates covariance information of the location coordinates of the $i^{th}$ target point, and t is an integer greater than or equal to 1.

Step 502: The radar sends the second information to an apparatus for obtaining drivable region information.

Step 503: The apparatus for obtaining drivable region information receives the second information sent by the radar.

When the method shown in FIG. 3 is performed by the fusion module that is separately disposed, in an embodiment shown in FIG. 7, the apparatus for obtaining drivable region information is the fusion module that is separately disposed. When the method shown in FIG. 3 is performed by the camera module that is internally equipped with the fusion module, in the embodiment shown in FIG. 7, the apparatus for obtaining drivable region information is the camera module that is internally equipped with the fusion module.

When the method shown in FIG. 7 is used to obtain the second information, a data calculation amount in the radar can be reduced, and overheads of the radar can be reduced, thereby saving resources of the radar.

Figure 8A:
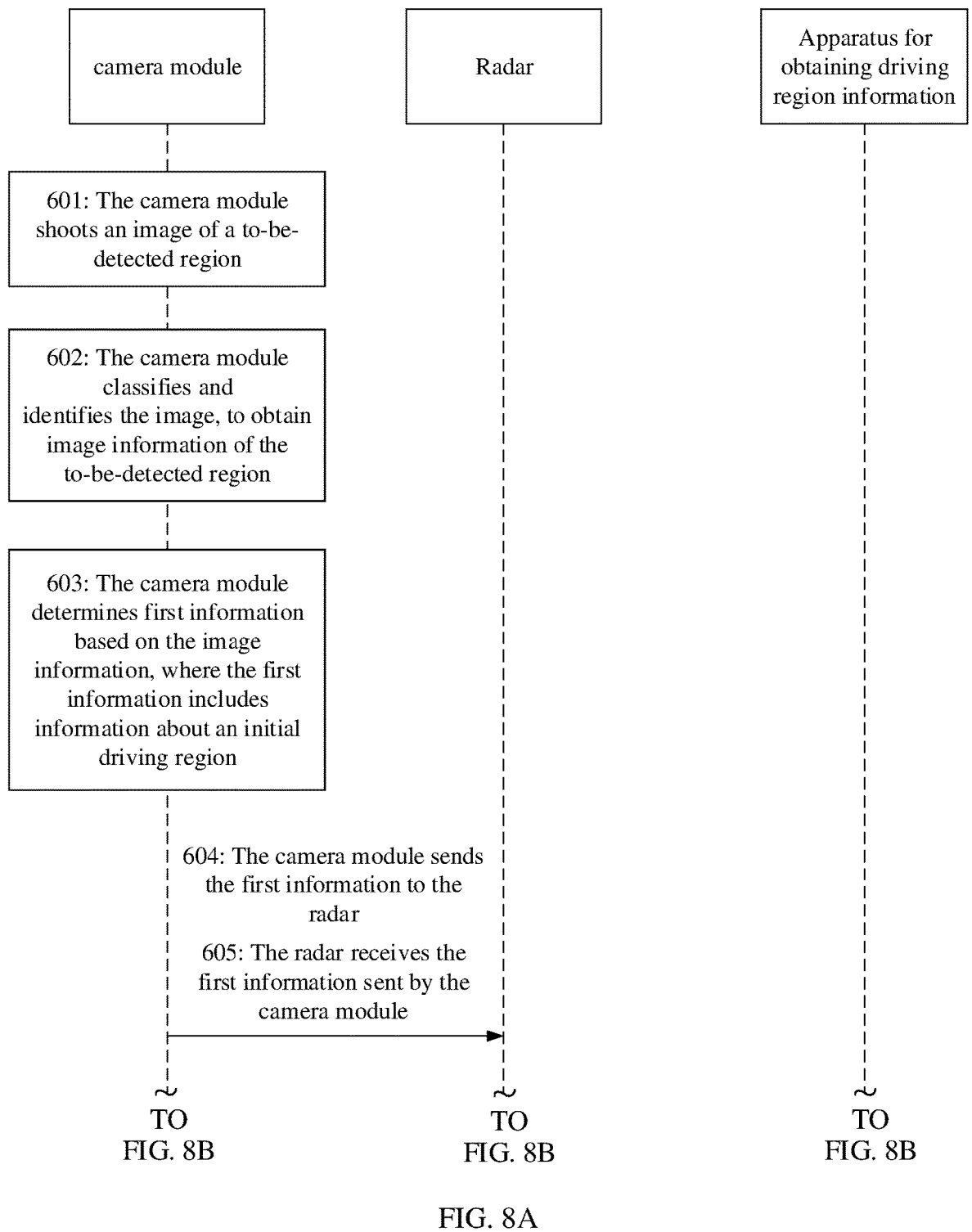
FIG. 8A and FIG. 8B are a schematic flowchart of another implementation of a method for obtaining second information according to an embodiment of this application.
Figure 8B:
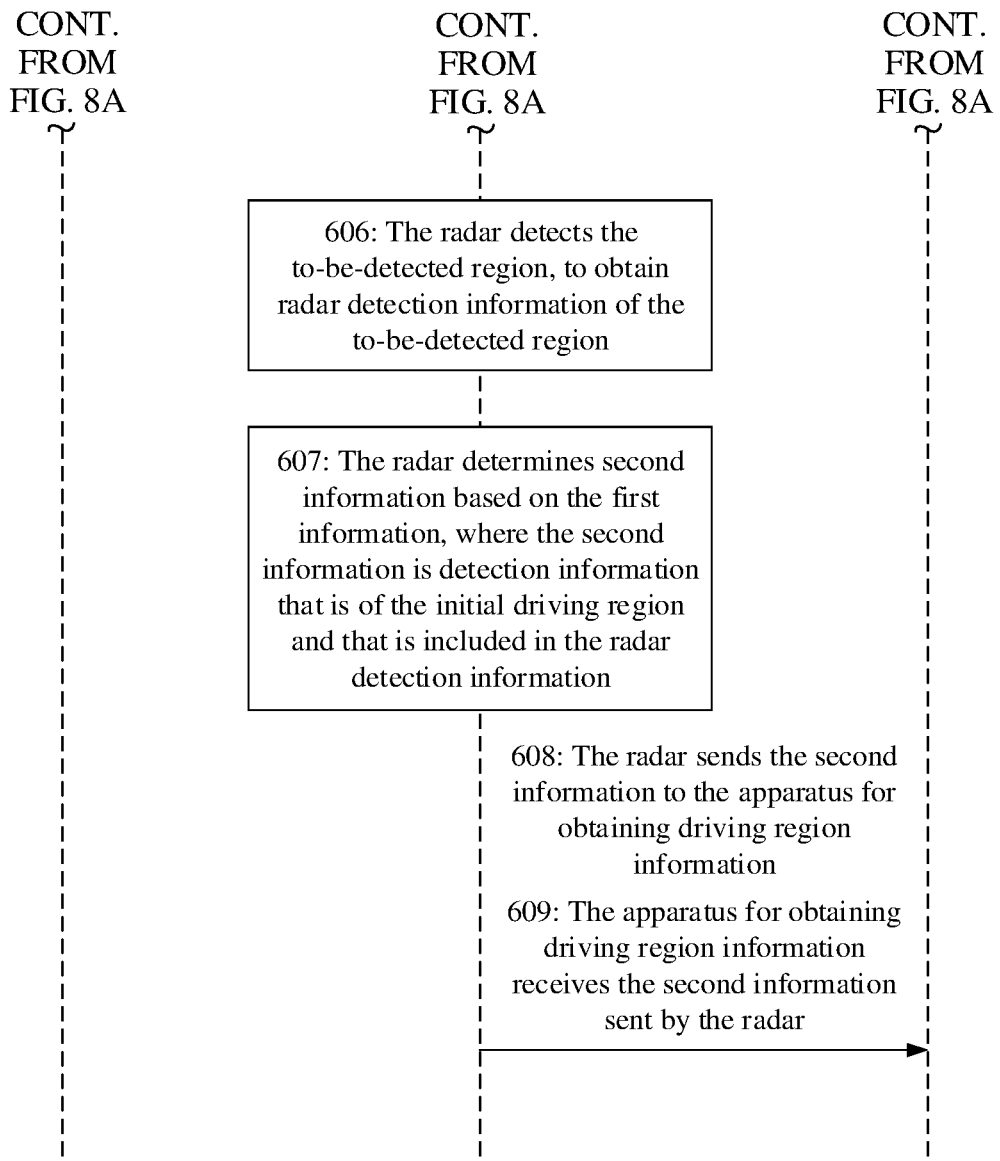

When the implementation shown in FIG. 7 is used to obtain the second information, the radar needs to send the radar detection information of the to-be-detected region to the apparatus for obtaining drivable region information, and consequently, a data transmission amount is relatively large; and when drivable region information is subsequently determined based on the first information and the second information, an amount of data that needs to be fused is relatively large, and a calculation amount is relatively large. Consequently, efficiency of determining the drivable region information is relatively low. To resolve this problem, as shown in FIG. 8A and FIG. 8B, the obtaining second information may alternatively be implemented according to the following steps.

Step 601: The camera module shoots an image of a to-be-detected region.

Step 602: The camera module classifies and identifies the image, to obtain image information of the to-be-detected region.

Step 603: The camera module determines the first information based on the image information, where the first information includes the information about an initial drivable region.

For specific implementations of step 601 to step 603, refer to step 201 to step 203 in the embodiment shown in FIG. 4. Details are not described herein again.

Step 604: The camera module sends the first information to a radar.

When the camera module sends, to the radar, the first information including the information about an initial drivable region, the information about an initial drivable region needs to be converted to be represented in the vehicle coordinate system or the world coordinate system.

Step 605: The radar receives the first information sent by the camera module.

Step 606: The radar detects the to-be-detected region, to obtain radar detection information of the to-be-detected region.

For a specific implementation of step 606, refer to step 501 in the embodiment shown in FIG. 7. Details are not described herein again.

Step 607: The radar determines the second information based on the first information, where the second information is detection information that is of the initial drivable region and that is included in the radar detection information.

Step 608: The radar sends the second information to an apparatus for obtaining drivable region information.

Step 609: The apparatus for obtaining drivable region information receives the second information sent by the radar.

When the method shown in FIG. 3 is performed by the fusion module that is separately disposed, in an embodiment shown in FIG. 8A and FIG. 8B, the apparatus for obtaining drivable region information is the fusion module that is separately disposed. When the method shown in FIG. 3 is performed by the camera module that is internally equipped with the fusion module, in the embodiment shown in FIG. 8A and FIG. 8B, the apparatus for obtaining drivable region information is the camera module that is internally equipped with the fusion module.

In the embodiment shown in FIG. 8A and FIG. 8B, an execution sequence of step 605 and step 606 may be changed. In other words, step 605 may be performed before step 606, or step 606 may be performed before step 605. This is not limited in this application.

When the method shown in FIG. 8A and FIG. 8B is used to obtain the second information, the radar only needs to send the detection information of the initial drivable region to the apparatus for obtaining drivable region information, so that a data transmission amount is relatively small; and when drivable region information is subsequently determined based on the first information and the second information, an amount of data that needs to be fused is relatively small, and a calculation amount is relatively small. Therefore, efficiency of determining the drivable region information can be improved.

Figure 9A:
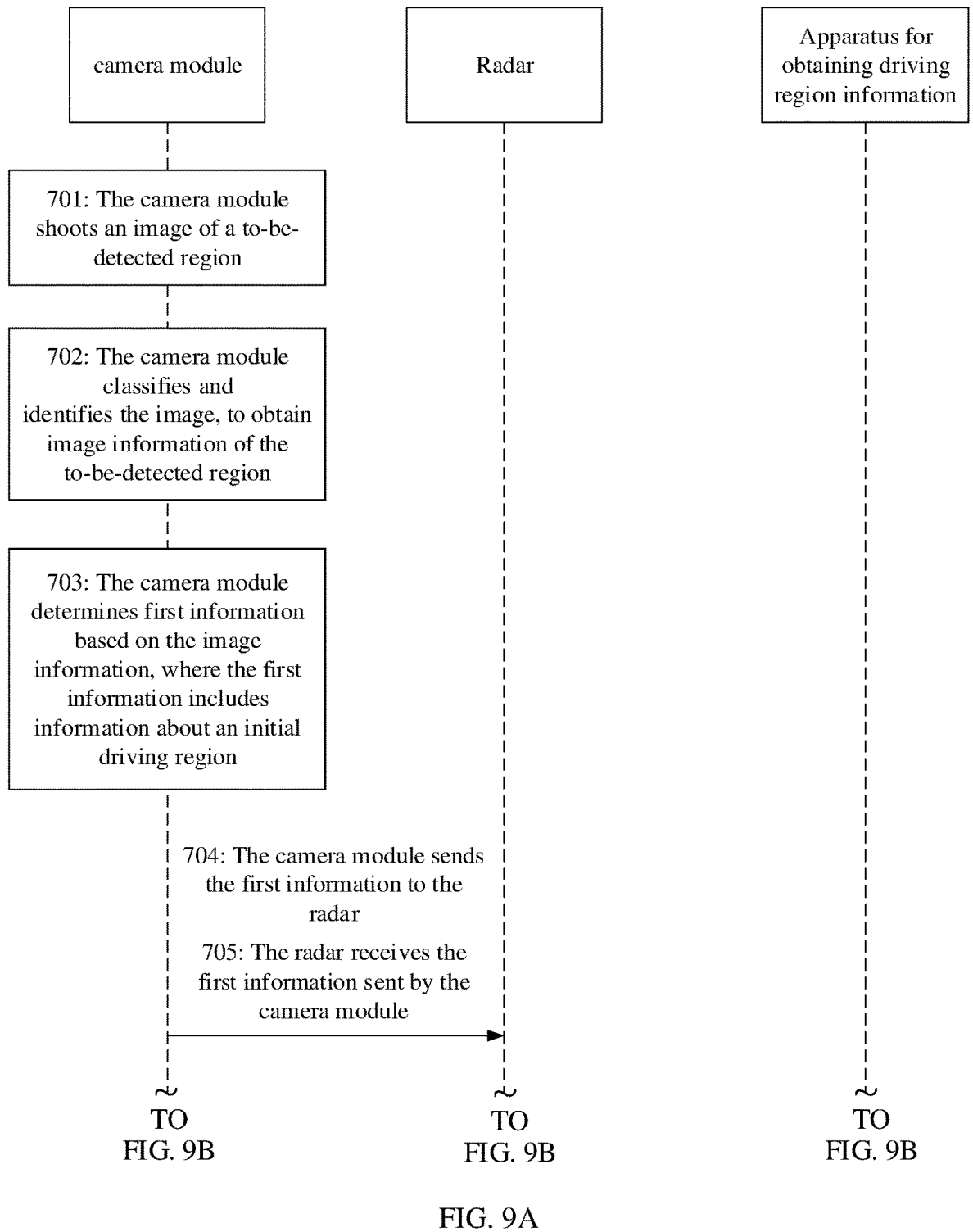

As shown in FIG. 9A and FIG. 9B, the obtaining second information may alternatively be implemented according to the following steps.

Step 701: The camera module shoots an image of a to-be-detected region.

Step 702: The camera module classifies and identifies the image, to obtain image information of the to-be-detected region.

Step 703: The camera module determines the first information based on the image information, where the first information includes the information about an initial drivable region.

For specific implementations of step 701 to step 703, refer to step 201 to step 203 in the embodiment shown in FIG. 4. Details are not described herein again.

Step 704: The camera module sends the first information to a radar.

When the camera module sends, to the radar, the first information including the information about an initial drivable region, the information about an initial drivable region needs to be converted to be represented in the vehicle coordinate system or the world coordinate system.

Step 705: The radar receives the first information sent by the camera module.

Step 706: The radar detects the initial drivable region based on the first information, to obtain the second information, where the second information includes radar detection information of the initial drivable region.

For a specific implementation of step 706, refer to step 501 in the embodiment shown in FIG. 7. Details are not described herein again.

Step 707: The radar sends the second information to an apparatus for obtaining drivable region information.

Step 708: The apparatus for obtaining drivable region information receives the second information sent by the radar.

When the method shown in FIG. 3 is performed by the fusion module that is separately disposed, in an embodiment shown in FIG. 9A and FIG. 9B, the apparatus for obtaining drivable region information is the fusion module that is separately disposed. When the method shown in FIG. 3 is performed by the camera module that is internally equipped with the fusion module, in the embodiment shown in FIG. 9A and FIG. 9B, the apparatus for obtaining drivable region information is the camera module that is internally equipped with the fusion module.

When the method shown in FIG. 9A and FIG. 9B is used to obtain the second information, the radar only needs to send the detection information of the initial drivable region to the apparatus for obtaining drivable region information, so that a data transmission amount is relatively small; and when drivable region information is subsequently determined based on the first information and the second information, an amount of data that needs to be fused is relatively small, and a calculation amount is relatively small. Therefore, efficiency of determining the drivable region information can be improved.

Step 103: Determine first drivable region information based on the first information and the second information.

When the method shown in FIG. 3 is performed by the fusion module that is separately disposed or the camera module that is internally equipped with the fusion module, the determining first drivable region information based on the first information and the second information may be implemented in the following manner: fusing the first information and the second information, and determining, as the first drivable region information, information generated after the first information and the second information are fused.

To further improve accuracy of the first drivable region information, the determining first drivable region information based on the first information and the second information may alternatively be implemented in the following two manners.

Figure 10:
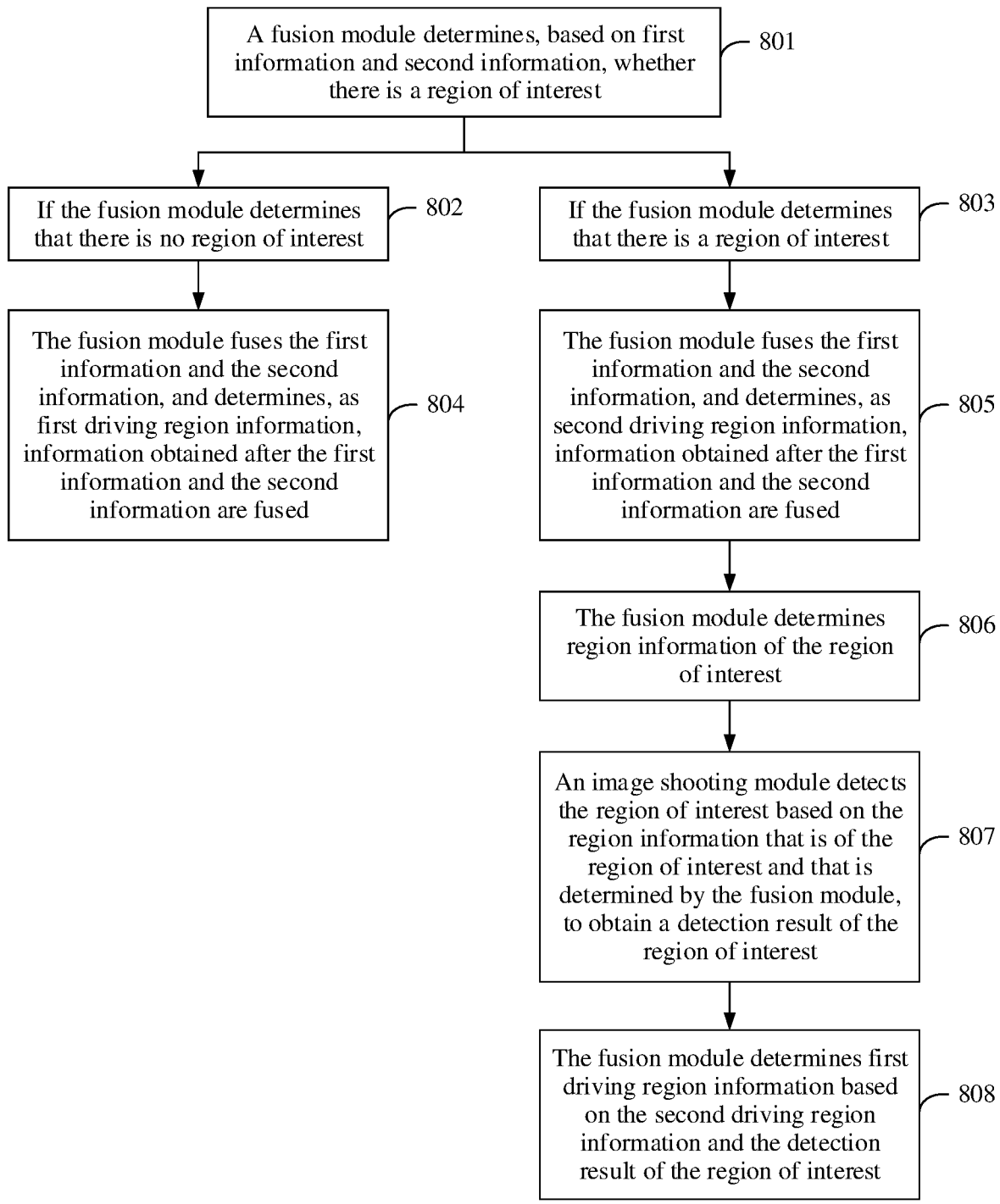
FIG. 10 is a schematic flowchart of an implementation of a method for determining first drivable region information based on first information and second information according to an embodiment of this application.

In the first manner, the method shown in FIG. 3 is performed by the camera module that is internally equipped with the fusion module, and as shown in FIG. 10, the determining first drivable region information based on the first information and the second information may be implemented according to the following steps.

Step 801: The fusion module determines, based on the first information and the second information, whether a region of interest exists.

The fusion module fuses the first information and the second information by using a statistical fusion algorithm, for example, a Bayes algorithm, and determines, based on a result of the fusion, whether there is a region with a suspicious detection result, namely, a region with an inaccurate detection result, in the initial drivable region. In this embodiment of this application, the region with the suspicious detection result is briefly referred to as a region of interest (ROI).

Step 802: If the fusion module determines that a region of interest does not exist, the fusion module performs step 804.

Step 803: If the fusion module determines that a region of interest exists, the fusion module performs step 805.

Step 804: The fusion module fuses the first information and the second information, and determines, as the first drivable region information, information obtained after the first information and the second information are fused.

Step 805: The fusion module fuses the first information and the second information, and determines, as second drivable region information, information obtained after the first information and the second information are fused.

Step 806: The fusion module determines region information of the region of interest.

The fusion module may determine the region information of the region of interest based on the result of the fusion obtained in step 801.

Step 807: The camera module detects the region of interest based on the region information that is of the region of interest and that is determined by the fusion module, to obtain a detection result of the region of interest.

The camera module classifies and identifies, based on the region information of the region of interest, the image of the to-be-detected region again; determines, based on a result of the classification and identification, whether a category of a pixel corresponding to the region of interest is "drivable"; and determines whether the region of interest is a region in which a vehicle can travel.

Based on this, the detection result of the region of interest includes that the region of interest is a region in which a vehicle can travel, or that the region of interest is an obstacle region in which a vehicle cannot travel.

Optionally, when step 807 is performed, the camera module may classify and identify the image of the to-be-detected region by using a semantic segmentation algorithm or an instance segmentation algorithm that is based on a CNN, or may classify and identify the image of the to-be-detected region by using another classifier that is relatively simple, for example, a support vector machine (SVM) classifier or an AdaBoost classifier.

Step 808: The fusion module determines the first drivable region information based on the second drivable region information and the detection result of the region of interest.

If the detection result of the region of interest is that the region of interest is a region in which a vehicle can travel, the fusion module determines the second drivable region information as the first drivable region information. Alternatively, if the detection result of the region of interest is that the region of interest is an obstacle region in which a vehicle cannot travel, the fusion module determines information, in the second drivable region information, other than the region information of the region of interest as the first drivable region information.

When the method shown in FIG. 10 is used to determine the first drivable region information, the determined first drivable region information is more accurate, and safety is higher when a vehicle subsequently travels based on the first drivable region information.

Figure 11A:
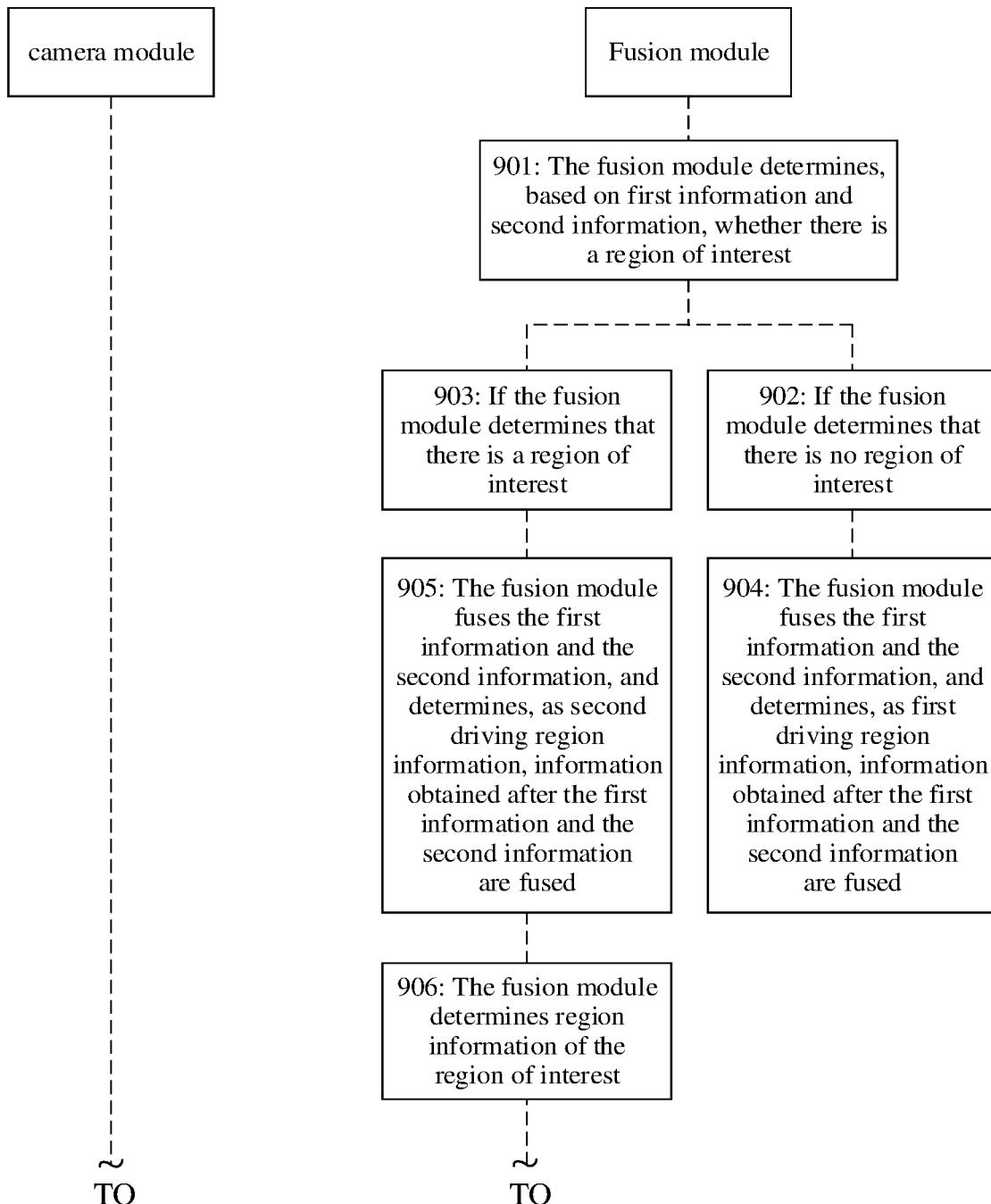
FIG. 11A and FIG. 11B are a schematic flowchart of another implementation of a method for determining first drivable region information based on first information and second information according to an embodiment of this application.
Figure 11B:
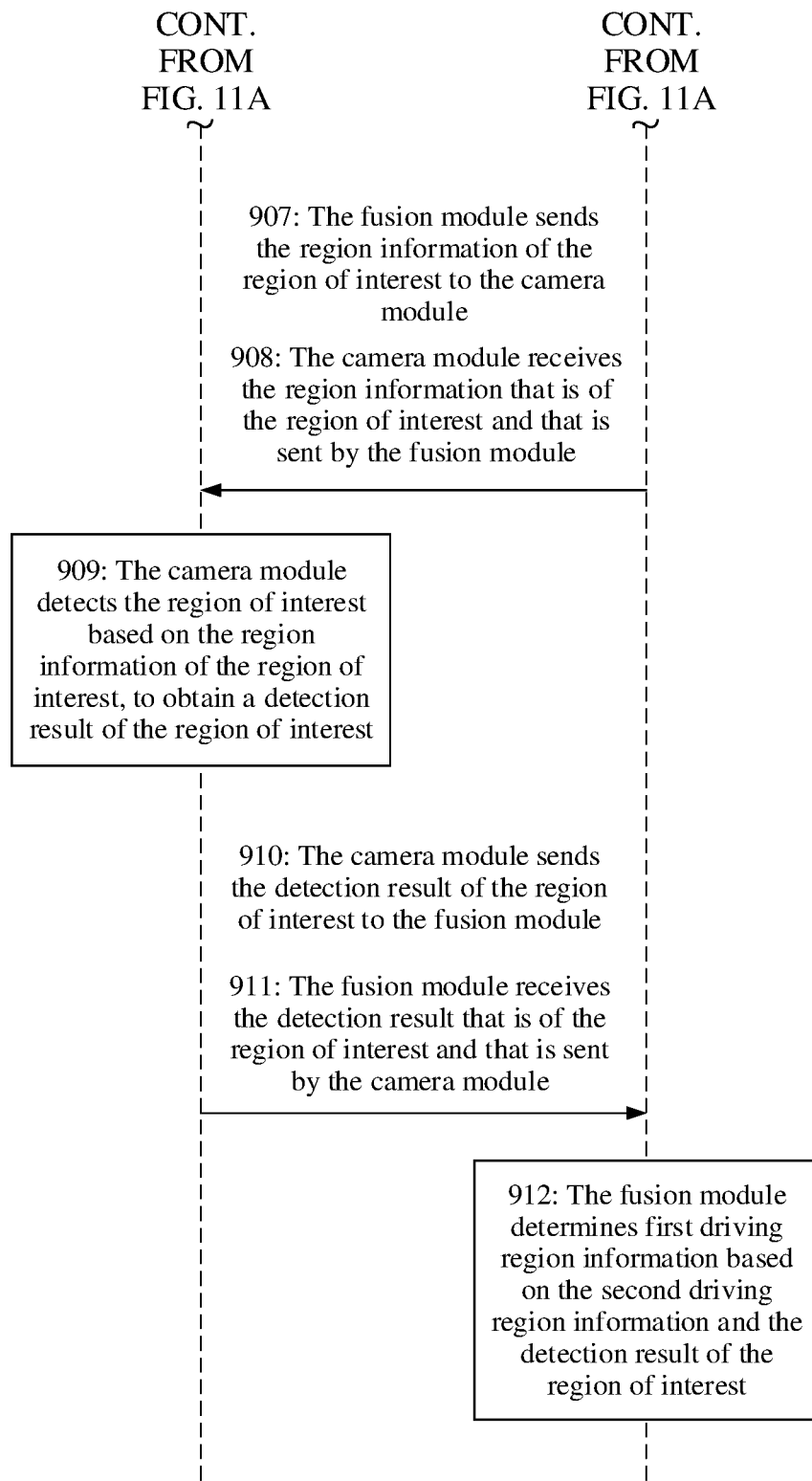

In the second manner, the method shown in FIG. 3 is performed by the fusion module that is separately disposed, and as shown in FIG. 11A and FIG. 11B, the determining first drivable region information based on the first information and the second information may be implemented according to the following steps.

Step 901: The fusion module determines, based on the first information and the second information, whether a region of interest exists.

For a specific implementation of step 901, refer to step 801 in the embodiment shown in FIG. 10. Details are not described herein again.

Step 902: If the fusion module determines that a region of interest does not exist, the fusion module performs step 904.

Step 903: If the fusion module determines that a region of interest exists, the fusion module performs step 905.

Step 904: The fusion module fuses the first information and the second information, and determines, as the first drivable region information, information obtained after the first information and the second information are fused.

Step 905: The fusion module fuses the first information and the second information, and determines, as second drivable region information, information obtained after the first information and the second information are fused.

Step 906: The fusion module determines region information of the region of interest.

For a specific implementation of step 906, refer to step 806 in the embodiment shown in FIG. 10. Details are not described herein again.

Step 907: The fusion module sends the region information of the region of interest to the camera module.

Step 908: The camera module receives the region information that is of the region of interest and that is sent by the fusion module.

Step 909: The camera module detects the region of interest based on the region information of the region of interest, to obtain a detection result of the region of interest.

For a specific implementation of step 909, refer to step 807 in the embodiment shown in FIG. 10. Details are not described herein again.

Step 910: The camera module sends the detection result of the region of interest to the fusion module.

Step 911: The fusion module receives the detection result that is of the region of interest and that is sent by the camera module.

Step 912: The fusion module determines the first drivable region information based on the second drivable region information and the detection result of the region of interest.

For a specific implementation of step 912, refer to step 808 in the embodiment shown in FIG. 10. Details are not described herein again.

When the method shown in FIG. 11A and FIG. 11B is used to determine the first drivable region information, the determined first drivable region information is more accurate, and safety is higher when a vehicle subsequently travels based on the first drivable region information.

According to the method for determining drivable region information provided in this application, first, the first information is obtained, where the first information includes the information that is about the initial drivable region and that is determined based on the image; then, the second information including the radar detection information is obtained; and finally, the first drivable region information is determined based on the first information and the second information. It can be learned that the first drivable region information, obtained according to the method for determining drivable region information provided in this application, is obtained by fusing the image information and the radar detection information, and has higher accuracy; and when detection performed by one of an camera apparatus and a radar apparatus is inaccurate, for example, when the camera apparatus is in an environment in which there is a shadow or a block, or when a laser radar is affected by a climate or when a vehicle-mounted radar is affected by a noise signal, the accuracy of the first drivable region information can be improved by using detection information of the other one of the camera apparatus and the radar apparatus, and safety of vehicle traveling is ensured.

The following describes apparatus embodiments corresponding to the foregoing method embodiments.

Figure 12:
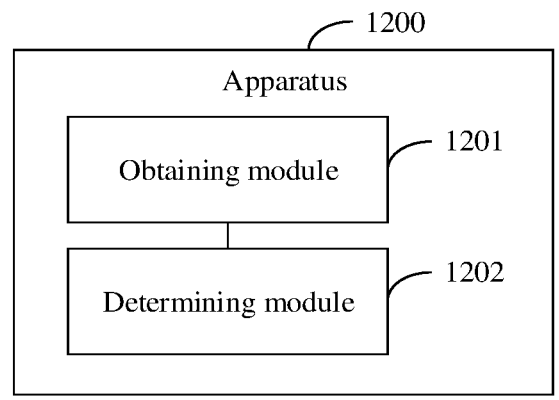
FIG. 12 is a structural block diagram of an implementation of an apparatus for determining drivable region information according to an embodiment of this application.

FIG. 12 is a structural block diagram of an implementation of an apparatus for determining drivable region information according to this application. With reference to FIG. 12, it can be learned that the apparatus 1200 includes: an obtaining module 1201, configured to obtain first information, where the first information includes information about an initial drivable region determined based on at least one image, and the at least one image is from at least one camera module, where the obtaining module 1201 is further configured to obtain second information, where the second information includes radar detection information; and a determining module 1202, configured to determine first drivable region information based on the first information and the second information.

The apparatus provided in this application first obtains the first information, where the first information includes the information that is about the initial drivable region and that is determined based on the image; then obtains the second information including the radar detection information; and finally, determines the first drivable region information based on the first information and the second information. It can be learned that the first drivable region information, obtained by the apparatus for determining drivable region information provided in this application, is obtained by fusing image information and the radar detection information, and has higher accuracy; and when detection performed by one of an camera apparatus and a radar apparatus is inaccurate, for example, when the camera apparatus is in an environment in which there is a shadow or a block, or when a laser radar is affected by a climate or when a vehicle-mounted radar is affected by a noise signal, the accuracy of the first drivable region information can be improved by using detection information of the other one of the camera apparatus and the radar apparatus, and safety of vehicle traveling is ensured.

Optionally, the radar detection information includes detection information of the initial drivable region.

Optionally, the determining module 1202 is further configured to: determine, based on the first information and the second information, whether a region of interest exists.

Optionally, the determining module 1202 is further configured to determine that a region of interest exists; the obtaining module 1201 is further configured to obtain second drivable region information and region information of the region of interest; the obtaining module 1201 is further configured to obtain a detection result of the region of interest based on the region information of the region of interest; and the determining module 1202 is further configured to determine the first drivable region information based on the second drivable region information and the detection result of the region of interest.

Optionally, the information about an initial drivable region includes information about at least one pixel corresponding to the initial drivable region; or the information about an initial drivable region is indicated by boundary information of the initial drivable region.

Optionally, the radar detection information includes location coordinates information; or the radar detection information includes location coordinates information and covariance information of the location coordinates.

The apparatus 1200 provided in the embodiment shown in FIG. 12 may be a fusion module that is separately disposed, or may be an camera module that is internally equipped with a fusion module. The apparatus 1200 may be used to implement the method provided in the embodiment shown in FIG. 3, and a same beneficial effect is achieved.

Figure 13:
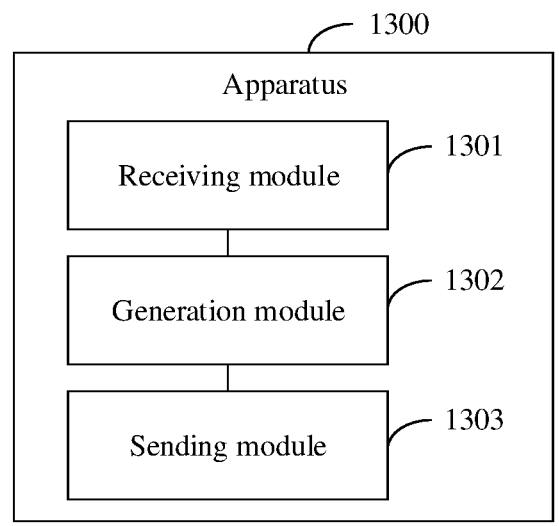
FIG. 13 is a structural block diagram of another implementation of an apparatus for determining drivable region information according to an embodiment of this application.

FIG. 13 is a structural block diagram of another implementation of an apparatus for determining drivable region information according to this application. With reference to FIG. 13, it can be learned that the apparatus 1300 includes:

a receiving module 1301, configured to receive first information, where the first information includes information about an initial drivable region determined based on at least one image, and the at least one image is from at least one camera module;

a generation module 1302, configured to generate second information, where the second information includes radar detection information that is of the initial drivable region generated based on the first information; and a sending module 1303, configured to send the second information.

The apparatus provided in this implementation first receives the first information; then generates, based on the first information, the second information including the radar detection information of the initial drivable region; and finally, sends the second information to an apparatus for obtaining drivable region information. It can be learned that, according to the apparatus provided in this implementation, a radar only needs to send the radar detection information of the initial drivable region to the apparatus for obtaining drivable region information, so that a data transmission amount is relatively small; and when first drivable region information is subsequently determined based on the first information and the second information, an amount of data that needs to be fused is relatively small, and a calculation amount is relatively small. Therefore, efficiency of determining the drivable region information can be improved.

During specific implementation, the embodiments of this application further provide a computer storage medium, where the computer storage medium may store a program, the program includes instructions, and when the program is executed, some or all of the steps of the method for determining drivable region information provided in this application may be included. The computer storage medium may be a magnetic disk, an optical disc, a read-only memory (read-only memory, ROM), a random access memory (random access memory, RAM), or the like.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, the procedures or the functions according to this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

It should be understood that, in the embodiments of this application, an execution sequence of the steps should be determined based on functions and internal logic of the steps, and sequence numbers of the steps do not mean the execution sequence, and do not constitute a limitation on an implementation process of the embodiments.

In addition, in the descriptions of this application, "a plurality of" means two or more than two, unless otherwise specified. In addition, to clearly describe the technical solutions in the embodiments of this application, terms such as "first" and "second" are used in the embodiments of this application to distinguish between same items or similar items that have basically same functions and purposes. Persons skilled in the art may understand that the terms such as "first" and "second" do not limit a quantity or an execution sequence, and the terms such as "first" and "second" do not indicate a definite difference.

All parts in this specification are described in a progressive manner. For same or similar parts in the embodiments, refer to these embodiments, and each embodiment focuses on a difference from another embodiment. Especially, the embodiments of the apparatus for determining drivable region information are basically similar to the method embodiments, and therefore are described briefly. For related parts, refer to descriptions in the method embodiments.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

The foregoing implementations of this application are not intended to limit the protection scope of this application.

What is claimed is:

1. A method comprising:
   obtaining first information, wherein the first information comprises information about an initial drivable region in a physical region for a vehicle and is based on at least one image of the physical region, and the at least one image is from at least one camera module, the initial drivable region being a region initially identified for the vehicle as free of obstacles to travel, wherein
      the information about the initial drivable region comprises information of at least one pixel of an image of the initial drivable region; or
      the information about the initial drivable region comprises boundary information of the image of the initial drivable region;
   obtaining second information, wherein the second information comprises radar detection information of the physical region;
   determining, based on the first information and the second information, whether a region of interest exists in the initial drivable region, wherein the region of interest is a region with an inaccurate detection result based on fusing the first information and the second information;
   upon determining that the region of interest exists,
   obtaining, based on the first information and the second information, second drivable region information and region information of the region of interest;
   sending the region information of the region of interest to the camera module;
   obtaining a detection result of the region of interest from the camera module, the detection result of the region of interest indicating whether an obstacle exists in the region of interest; and
   determining a first drivable region within which the vehicle is able to travel obstacle-free based on the second drivable region information and the detection result of the region of interest, wherein the first drivable region is within the initial drivable region.

2. The method according to claim 1, wherein the radar detection information comprises detection information of the initial drivable region.

3. The method according to claim 1, wherein detecting the region of interest comprises:
   classifying image information corresponding to the region of interest.

4. The method according to claim 3, comprising:
   classifying image information corresponding to the region of interest using a semantic segmentation algorithm or an instance segmentation algorithm, or using a classifier.

5. The method according to claim 1, further comprising:
   determining that the region of interest does not exist; and
   obtaining second drivable region information based on the first information and the second information, wherein the second drivable region information indicating the first drivable region.

6. The method according to claim 1, wherein:
   the boundary information includes information about f pixels of the image of the initial drivable region corresponding to a boundary of the initial drivable region, and the information about the f pixels is represented as $[(u_1, h_1), (u_2, h_2), (u_3, h_3), \ldots, (u_i, h_i), \ldots, (u_f, h_f)]$ in a pixel coordinate system, and wherein $u_i$ and $h_i$ indicate location coordinates of an $i^{th}$ pixel in the f pixels, $1 \leq i \leq f$, and f is an integer greater than or equal to 1.

7. The method according to claim 1, wherein:
   the boundary information includes information about r pixels of the image of the initial drivable region corresponding to a boundary of the initial drivable region, and the information about the r pixels is represented as $[step, (g_1, k_1), k_2, k_3, \ldots, k_i, \ldots, k_r]$ or $[step, (g_1, k_1), k_2, k_3, \ldots, k_i, \ldots, k_r, step\_method]$ in a pixel coordinate system, wherein $g_1$ and $k_1$ indicate location coordinates of a first pixel in the r pixels, $k_i$ indicates a vertical coordinate of an $i^{th}$ pixel in the r pixels, $1 \leq i \leq r$, a horizontal coordinate of the $i^{th}$ pixel is obtained based on the step, the step indicates an interval step between the horizontal coordinate of the $i^{th}$ pixel and a horizontal coordinate of an $(i+1)^{th}$ pixel, an interval step between the horizontal coordinate of the $i^{th}$ pixel and a horizontal coordinate of an $(i-1)^{th}$ pixel is same as the interval step between the horizontal coordinate of the $i^{th}$ pixel and the horizontal coordinate of the $(i+1)^{th}$ pixel, the step_method indicates a connection relationship between all interval steps, and r is an integer greater than or equal to 1.

8. The method according to claim 1, wherein:
   the boundary information includes information about s pixels of the image of the initial drivable region corresponding to a boundary of the initial drivable region, and the information about the s pixels is represented as $[(p_1, q_1), (p_2, q_2), (p_3, q_3), \ldots, (p_i, q_i), \ldots, (p_s, q_s), step\_method]$ in a pixel coordinate system, where $p_i$ and $q_i$ indicate location coordinates of an $i^{th}$ pixel in the s pixels, $1 \leq i \leq s$, there is an interval step between a horizontal coordinate of the $i^{th}$ pixel and a horizontal coordinate of an $(i+1)^{th}$ pixel, an interval step between the horizontal coordinate of the $i^{th}$ pixel and a horizontal coordinate of an $(i-1)^{th}$ pixel is different from the interval step between the horizontal coordinate of the $i^{th}$ pixel and the horizontal coordinate of the $(i+1)^{th}$ pixel, the step_method indicates a connection relationship between all interval steps, and s is an integer greater than or equal to 1.

9. The method according to claim 8, wherein:
   the step_method is linear interpolation, quadratic interpolation, cubic spline interpolation, or shape-preserving piecewise cubic interpolation.

10. The method according to claim 1, wherein
    the radar detection information comprises location coordinates information; or
    the radar detection information comprises location coordinates information and covariance information of location coordinates.

11. The method according to claim 1, wherein determining, based on the first information and the second information, whether the region of interest exists in the initial drivable region comprises:

determining a result of fusion using a statistical fusion algorithm based on the first information and the second information.

12. An apparatus comprising: one or more processors, and a non-transitory computer-readable storage medium storing program instructions; wherein, when executed by the one or more processors, the instructions cause the apparatus to:
obtain first information, wherein the first information comprises information about an initial drivable region in a physical region for a vehicle and is based on at least one image of the physical region, and the at least one image is from at least one camera module, the initial drivable region being a region initially identified for the vehicle as free of obstacles to travel, wherein,
the information of the initial drivable region comprises information of at least one pixel of an image of the initial drivable region; or
the information of the initial drivable region comprises boundary information of the image of the initial drivable region;
obtain second information, wherein the second information comprises radar detection information of the physical region;
determine, based on the first information and the second information, whether a region of interest exists in the initial drivable region, wherein the region of interest is a region with an inaccurate detection result based on fusing the first information and the second information;
upon determine that the region of interest exists,
obtain, based on the first information and the second information, second drivable region information and region information of the region of interest;
send the region information of the region of interest to the camera module;
obtain a detection result of the region of interest from the camera module, wherein the detection result of the region of interest indicating whether an obstacle exists in the region of interest; and
determine a first drivable region within which the vehicle is able to travel obstacle-free based on the second drivable region information and the detection result of the region of interest, wherein the first drivable region is within the initial drivable region.

13. The apparatus according to claim 12, wherein the radar detection information comprises detection information of the initial drivable region.

14. The apparatus according to claim 12, the instructions further cause the apparatus to:
classify image information corresponding to the region of interest.

15. The apparatus according to claim 12, wherein
the boundary information includes information about f pixels of the image of the initial drivable region corresponding to a boundary of the initial drivable region, and the information about the f pixels is represented as $[(u_1, h_1), (u_2, h_2), (u_3, h_3), \ldots, (u_i, h_i), \ldots, (u_f, h_f)]$ in a pixel coordinate system, and wherein $u_i$ and $h_i$ indicate location coordinates of an $i^{th}$ pixel in the f pixels, $1 \leq i \leq f$, and f is an integer greater than or equal to 1.

16. The apparatus according to claim 15, wherein the instructions further cause the apparatus to:
classify image information corresponding to the region of interest using a semantic segmentation algorithm or an instance segmentation algorithm or using classifier.

17. The apparatus according to claim 12, wherein
the boundary information includes information about r pixels of the image of the initial drivable region corresponding to a boundary of the initial drivable region, and the information about the r pixels is represented as $[step, (g_1, k_1), k_2, k_3, \ldots, k_i, \ldots, k_r]$ or $[step, (g_1, k_1), k_2, k_3, \ldots, k_i, \ldots, k_r, step\_method]$ in a pixel coordinate system, wherein $g_1$ and $k_1$ indicate location coordinates of a first pixel in the r pixels, $k_i$ indicates a vertical coordinate of an $i^{th}$ pixel in the r pixels, $1 \leq i \leq r$, a horizontal coordinate of the $i^{th}$ pixel is obtained based on the step, the step indicates an interval step between the horizontal coordinate of the $i^{th}$ pixel and a horizontal coordinate of an $(i+1)^{th}$ pixel, an interval step between the horizontal coordinate of the $i^{th}$ pixel and a horizontal coordinate of an $(i-1)^{th}$ pixel is same as the interval step between the horizontal coordinate of the $i^{th}$ pixel and the horizontal coordinate of the $(i+1)^{th}$ pixel, the step_method indicates a connection relationship between all interval steps, r is an integer greater than or equal to 1.

18. The apparatus according to claim 12, wherein
the boundary information includes information about s pixels of the image of the initial drivable region corresponding to a boundary of the initial drivable region, and the information about the s pixels is represented as $[(p_1, q_1), (p_2, q_2), (p_3, q_3), \ldots, (p_i, q_i), \ldots, (p_s, q_s), step\_method]$ in a pixel coordinate system, where $p_i$ and $q_i$ indicate location coordinates of an $i^{th}$ pixel in the s pixels, $1 \leq i \leq s$, there is an interval step between a horizontal coordinate of the $i^{th}$ pixel and a horizontal coordinate of an $(i+1)^{th}$ pixel, an interval step between the horizontal coordinate of the $i^{th}$ pixel and a horizontal coordinate of an $(i-1)^{th}$ pixel is different from the interval step between the horizontal coordinate of the $i^{th}$ pixel and the horizontal coordinate of the $(i+1)^{th}$ pixel, the step_method indicates a connection relationship between all interval steps, and s is an integer greater than or equal to 1.

19. The apparatus according to claim 18, wherein
the step_method is linear interpolation, quadratic interpolation, cubic spline interpolation, or shape-preserving piecewise cubic interpolation.

20. The apparatus according to claim 12, wherein determining that the region of interest exists in the initial drivable region comprises:
determining a result of fusion using a statistical fusion algorithm based on the first information and the second information.

* * * * *